UNITED STATES PATENT OFFICE.

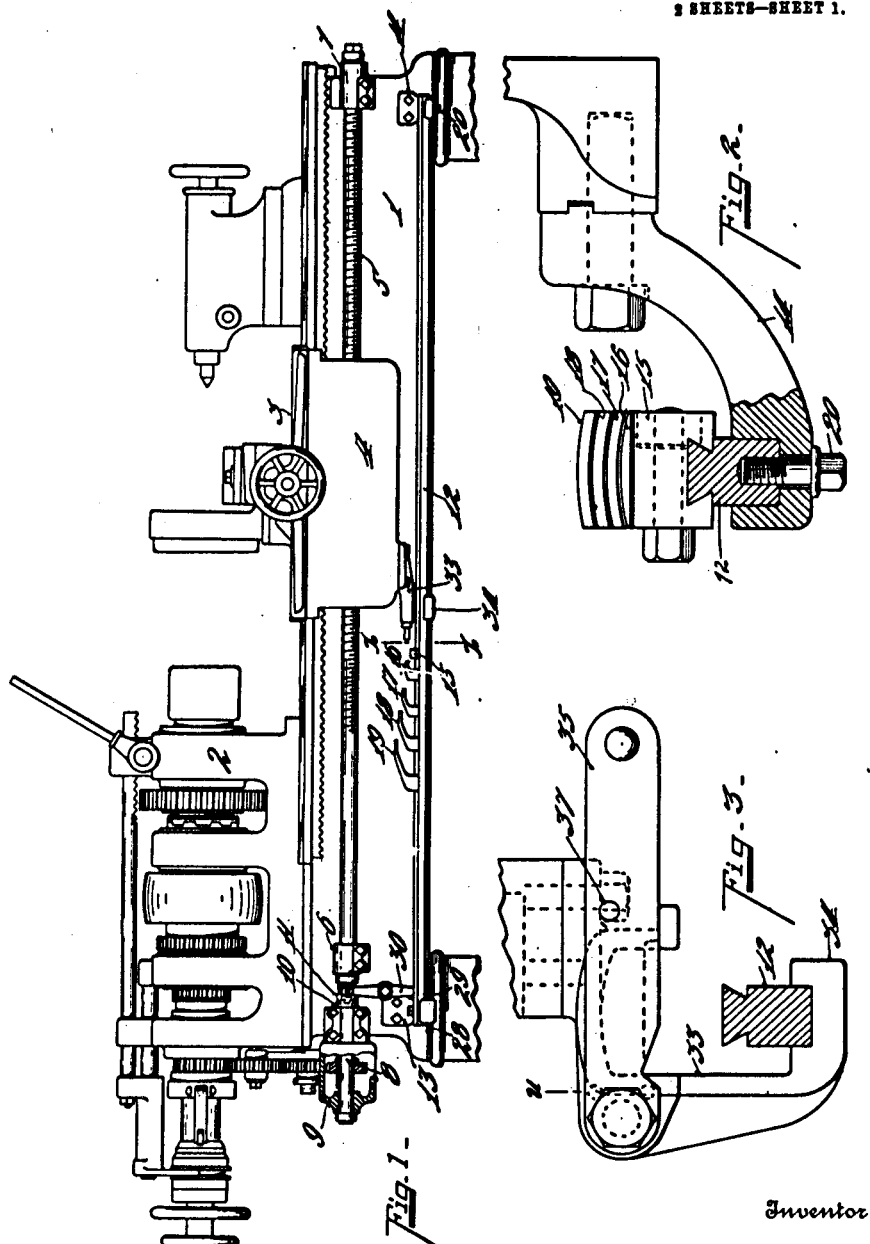

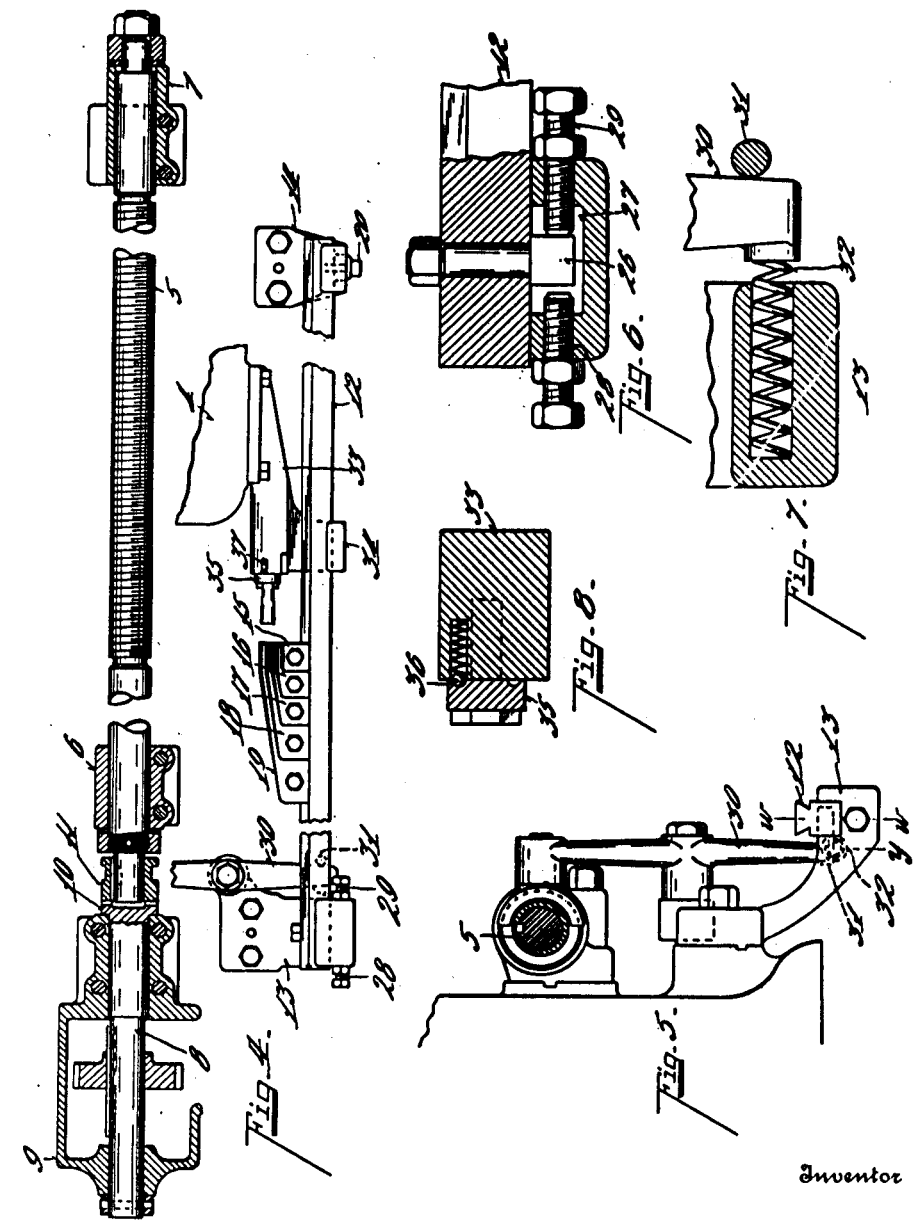

NICHOLAS D. CHARD, OF CINCINNATI, OHIO, ASSIGNOR TO THE LODGE & SHIPLEY MACHINE TOOL COMPANY, OF CINCINNATI, OHIO, A CORPORATION OF OHIO.

LATHE.

1,036,190.  Specification of Letters Patent.  Patented Aug. 20, 1912.

Application filed March 13, 1911. Serial No. 614,151.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to an improvement in lathes.
One of the objects of my invention is to provide means for automatically stopping the feed of the carriage at predetermined points and in which such carriage stoppage is made under delicate precision.
Another object of my invention is to provide a lathe with a series of stops in the path of carriage travel, adjustable or otherwise, adapted to be engaged by the carriage or means thereon, providing predetermined limits of carriage travel, and controlling factors in the disengagement of the carriage feed mechanism, with means for disengaging such feed operation within predetermined limits and definite control, whereby the carriage can be stopped at points of precision, and the mechanism is arrested against movement beyond such point or points insuring accuracy to the highest degree.
Another object of my invention relates to certain details of construction, and means for definitely arresting the movement of the carriage after it has been automatically stopped at one or more predetermined points in its travel.

The features of the invention are more fully set forth in the description of the accompanying drawings, forming a part of this specification, in which:—
Figure 1 is a front elevation of a lathe with my improvements applied. Fig. 2 is an enlarged end elevation, partly in section, of a bracket supporting the rail carrying the stops with a series of dogs mounted on such rail. Fig. 3 is an enlarged detailed section, taken on line *x*, *x*, Fig. 1. Fig. 4 is an enlarged detail section, partly in elevation, illustrating the automatic stop mechanism for the carriage, as shown in Fig. 1. Fig. 5 is an end elevation of the stop supporting rail, clutch actuating lever with the feed screw shown in section and with the elements in position as applied to the bed of the lathe. Fig. 6 is an enlarged section on line *w*, *w*, Fig. 5. Fig. 7 is a section on line *y*, Fig. 5. Fig. 8 is a section on line *u*, Fig. 3.

The general features of my improved automatic stop mechanism for lathe carriage or machine tool are similar in character and mode of operation to those features embodied in an application filed by me September 22, 1909, Serial No. 519,025, for improvement in lathes. These general features reside in the employment of clutch mechanism for controlling the operation of a feed screw or shaft, the lever mechanism for operating said clutch mechanism, a stop supporting rail in connection with said lever mechanism, provided with one or a series of stops adjustable upon said rail, and stop engaging mechanism in connection with the lathe apron, or carriage movable therewith, and traveling in a path for stop engagement, to disengage the clutching mechanism and automatically stop the feed of the carriage after the same has traveled a predetermined length. The stop engaging mechanism is such that it can be released without disturbing the position of the carriage for a second feed.

In my present invention, in addition to the foregoing, means are employed for definitely limiting the actuating movements of the automatic carriage stopping mechanism, whereby the control thereof can be maintained with great precision for accurately engaging the limit or limits of carriage feed, the amount of movement of the clutch shifting mechanism in either direction is definitely fixed so that there can be no possible further movement of the carriage in feeding after the clutch teeth are just disengaged, thereby controlling the length of carriage feed and cut to micrometer measurements.

1 represents the bed of the lathe, 2 the head-stock, which may be of any general or special form or type.

3 represents the lathe carriage, 4 the apron therefor, provided with the usual gearing and appliances for feeding the carriage longitudinally upon the bed or base and for driving the cross feed screw.

5 represents the screw feed shaft journaled in the bearings 6, 7, see Figs. 1 and 4.

8 represents a shaft journaled in the bearing brackets 9, said shaft being in horizontal alinement and concentric with the screw feed shaft 5, and provided with a clutch member 10, at one end thereof, adapted to be engaged with the sliding clutch member 11, splined upon the screw feed shaft 5.

It will be seen that when the sliding clutch member 11 is disengaged from the clutch member of shaft 8, said two shafts 8 and 5 have absolutely no connection with each other, thereby eliminating any frictional engagement between the two shafts, which might have a tendency to slightly rotate the feed screw shaft 5 in its disengaged position, as such slight rotation or movement of the feed screw shaft would have a tendency to distort the accuracy of the automatic stop features. The shaft 8 is connected by a train of gearing with the spindle driving mechanism common in the lathe art and which gearing may be of change or variable speed type.

12 represents a stop supporting rail, preferably, slidably mounted in the brackets 13, 14, fixed to the lathe bed and projecting therefrom; the rail, as illustrated in cross section, has a dove-tailed way for the reception of a series of stops 15, 16, 17, 18 and 19, arranged and constructed to permit individual adjustment, but of vertical overlapping organization, in order to enable the same to be brought together collectively as a unit, to aline all the stops to one fixed degree or point. The rail 12 is slidably mounted within a groove formed in the bracket 14.

20 represents a screw, (see Fig. 2), projected through an oblong slot formed in the bracket 14 and engaged with the rail 12, providing a means for vertical displacement of said rail. The opposite end of the rail 12 is provided with a stop plug 26, fixed to the rail and projected into a recess 27, formed in the bracket 13.

28, 29, represent set screws engaged with the bracket, one upon each side of the stop plug, to provide micrometer gage limits of rail movement, and serving as stops when the stop plug 26 engages either one of said screws to arrest the movement of the rail, and also, to arrest the movement of the carriage when the carriage engages any one of the stops, and in its travel has moved the rail 12 sufficiently to abut against, say the screw 28, such movement of the rail having been sufficient to that required for disengaging the teeth of the clutch elements for controlling the drive of the feed screw shaft.

30 represents a lever pivotally mounted upon the bracket 13, one end engaged with the clutch member 11 and the opposite end engaging a pin 31, see Figs. 4, 5 and 7, fixed to and projecting from the stop supporting rail 12.

32 represents a spring supported within a bore, formed in the bracket 13 and engaging with the lever 30, for automatically controlling the movement of lever 30, clutch member 11, and stop supporting rail 12, to return said elements to a normal position after a carriage disengagement from any one of the series of stops.

In the drawings, I have illustrated a specific form of mechanism mounted on the carriage for engaging the stops, but it is obvious, that the form shown in my said prior application, is equally as effective. It is also obvious, that various other types of construction can be employed and designed to accomplish a similar result, the form herein, however, is very simple in construction, and comprises the following elements:—33 represents a bracket fixed to and projecting from the carriage apron 4, and provided with an arm 34, engaging with the stop supporting rail to provide a support therefor, to prevent flexing of said rail in the carriage engagement with the stops. 35 represents a hand lever pivotally mounted upon the bracket 33, adapted to be swung into the path of any one of the stops 15, etc., and be engaged therewith to actuate the rail and clutching mechanism. 36 represents a spring actuated ball detent mounted within the bracket 33, adapted to engage into recesses formed in the hand lever 35, for maintaining said lever in various adjusted positions. 37 represents a pin projecting from said hand lever 35, serving as a stop, adapted to engage with a projecting lug formed on the bracket 33, to limit the descent movement of the hand lever 35.

In operation, in initially setting the dogs, the tool is properly adjusted relative to the work and the rail 12 moved to engage the stop screw 28, after which the screw is adjusted to bring the various clutch actuating elements to a position which will free the teeth of the clutch members to a delicate point of disengagement required to effect a clearance between the one as a revolving element and the other as stationary without frictional contact, so that when the clutches are disengaged, the shaft will be absolutely at rest. With such adjustment made, the parts are permitted to return to normal, and with the set screw 29 adjusted so as to relieve the clutch teeth of the spring pressure exerted against the lever 30, and also, to provide for a fixed reverse movement of the rail, in order to provide definite gaging points for stop adjustment upon the rail.

In operation, the stop 28 is delicately set so that when member 26 engages it the clutch teeth will just clear; and the other stop 27 is adjusted so that when member 26 engages it the clutch teeth will be just intermeshed to the exact and proper degree. It is obvious that thereafter the clutch movements will be invariable and that the feed will always be thrown out or thrown in at the exact points determined by the adjustment of the stops 27 and 28. The rail 12 is then shifted to bring member 26 against stop 28, that is the cut out point of the clutch, and the lugs 15 and 16, etc., are then adjusted on the rail while in this position. The result is that the feed is automatically cut out with entire and invariable precision at the instant member 26 strikes the stop 28 when the carriage is feeding, and no hand feed need be resorted to to effect the last portion of the cut. The rail 12 can only be retracted until member 26 strikes stop 27 so that the clutch teeth are always engaged to an invariable degree of intermesh and the rail can only move through the distance defined by the adjustment of stops 27, 28. If this stop mechanism for the rail or clutch actuating member, were not present, the impact of the table in shifting rail 12 to engage the clutch teeth would be borne by the clutch elements, tending not only to wear but to dislodge them and destroying their delicacy of position. As all lost motion is translated into the cut it is evident that precision work and invariability cannot be obtained where the clutch members are subjected to the strains of the moving carriage and where the distance through which the shifting clutch member moves is subject to variation. By my improvement these strains are all borne by the bed, the movement of the shifting rail in either direction is fixed and delicately adjustable and the clutch members are held from all danger of injury, wear or lost motion which could be translated into the cut. The rail, in this instance, as illustrated, is supported in the brackets, one at each end of the lathe bed, and by means of an arm projected from the carriage apron, which produces sufficient support against flexing of said rail upon certain lines of work, it is obvious, however, that various ways and means may be employed for supporting said rail to absolutely prevent any flexing thereof, which might have a tendency to distort the accuracy of the automatic control within the province of this invention.

While I have shown my invention as applied to one particular form of automatic carriage stop mechanism, it is obvious that the features can be applied to various other forms, as for instance, the types as illustrated and described in a prior application, from that above enumerated, to-wit, Serial No. 570,832, filed July 7, 1910, for lathes, and in Patent No. 981,915, of January 17, 1911, for engine lathes, and, therefore, the essential characteristic herein is in providing micrometically adjustable limits of movement of carriage and stopping mechanism in arresting the movement of the carriage in one direction after the feed has been discontinued or cut out, as well as limiting or arresting the clutch actuating mechanism in all of its directions of movement.

If it is desired, the stop 28 may be so adjusted that the clutch will be thrown out, stopping the feed just before member 26 engages stop 28 and the remainder of the cut can be made by hand feed which will bring member 26 against stop 28, positively blocking the carriage movement. But in any event the position of the stop 28 defines the limit of the cut and takes all strains off of the clutch members.

Having described my invention, I claim:

1. In a machine of the class described, a bed, a carriage movable thereon, feed mechanism for traversing the carriage on the bed, driving means, a clutch adapted to connect said feed mechanism with said driving means, reciprocating actuating means connected with said clutch, means mounted on said carriage to engage and operate said actuating means to disengage the clutch at predetermined points of carriage travel, and means to stop the movement of said actuating means in both directions of its movement.

2. In a machine of the class described, a bed, a carriage movable thereon, feed mechanism for traversing the carriage on the bed, driving means, a clutch adapted to connect said feed mechanism with said driving means, reciprocating actuating means connected with said clutch, means mounted on said carriage to engage and operate said actuating means to disengage the clutch at predetermined points of carriage travel, and means to stop the movement of said actuating means in both directions of its movement, said means being adjustably supported by the bed.

3. In a machine of the class described, a bed, a carriage movable thereon, feed mechanism for traversing the carriage on the bed, driving means, a clutch adapted to connect said feed mechanism with said driving means, reciprocating actuating means connected with said clutch, means mounted on said carriage to engage and operate said actuating means to disengage the clutch at predetermined points of carriage travel, and means to stop the movement of said actuating means in its direction of travel for intermeshing the clutch members and positioned to arrest such movement at the point where said members are intermeshed to the proper and invariable degree.

In testimony whereof, I have hereunto set my hand.

NICHOLAS D. CHARD.

Witnesses:
OLIVER B. KAISER,
CLARENCE B. FOSTER.